May 19, 1970     H. H. WEINING     3,512,412
LIQUID LEVEL INDICATING DEVICE
Filed Oct. 19, 1967     4 Sheets-Sheet 1
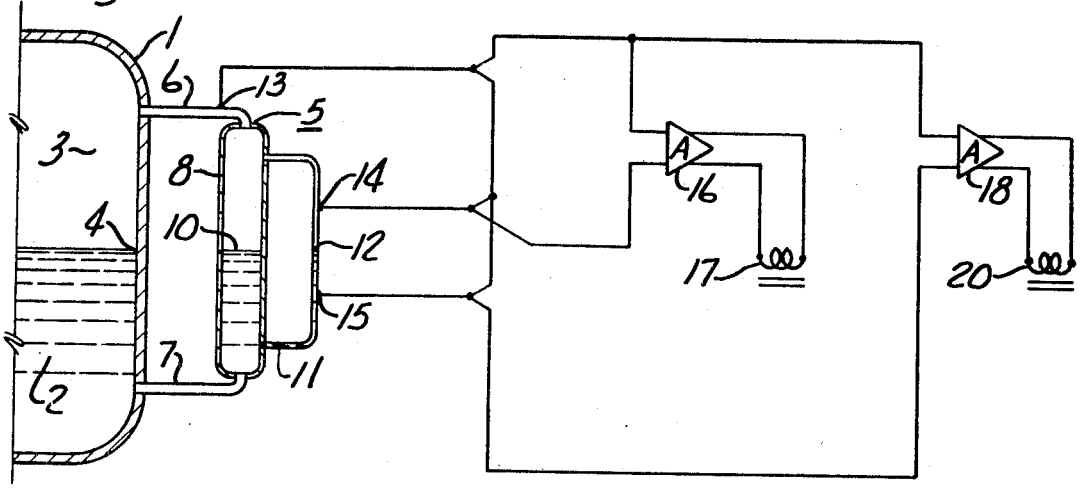
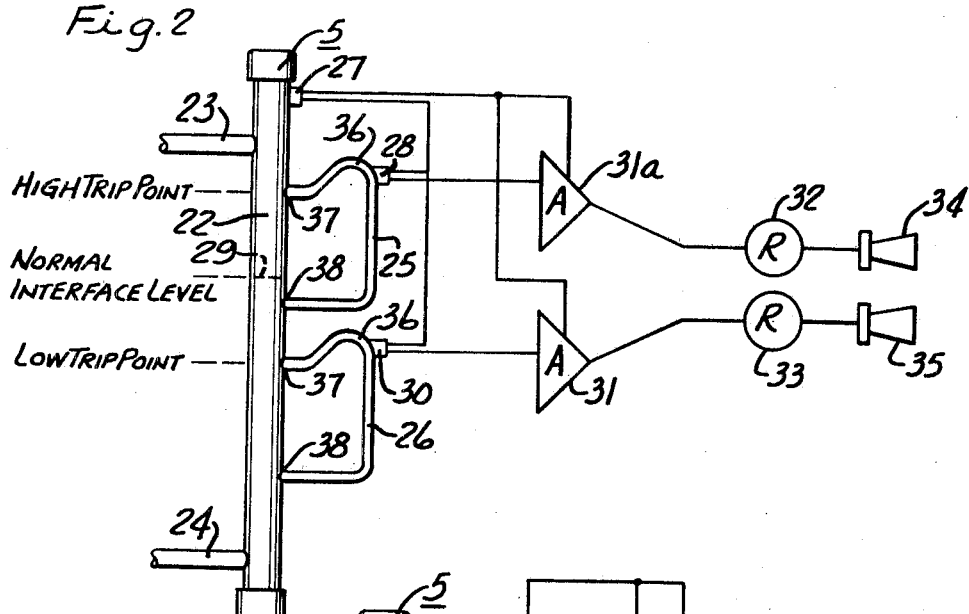
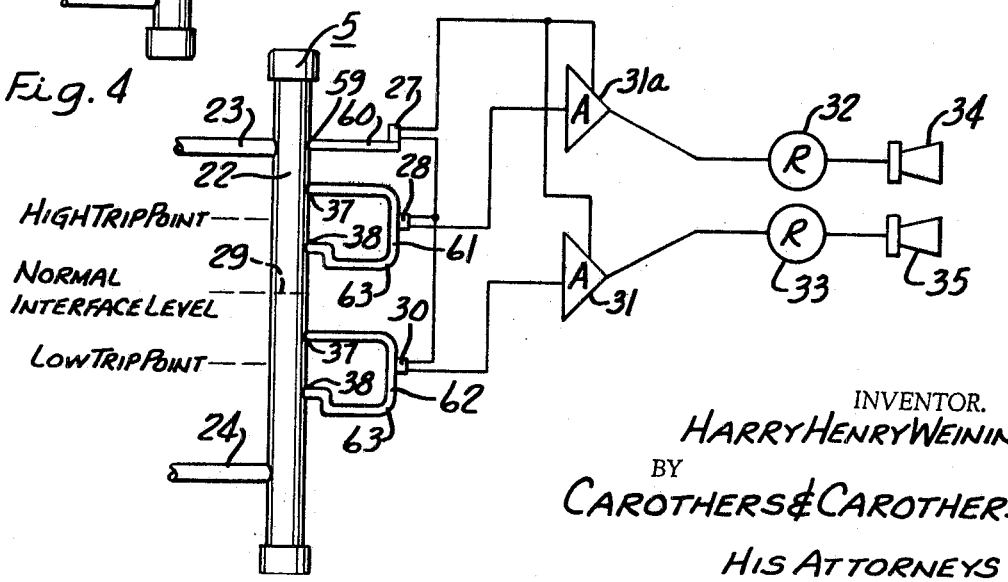
INVENTOR.
HARRY HENRY WEINING
BY
CAROTHERS & CAROTHERS
His Attorneys

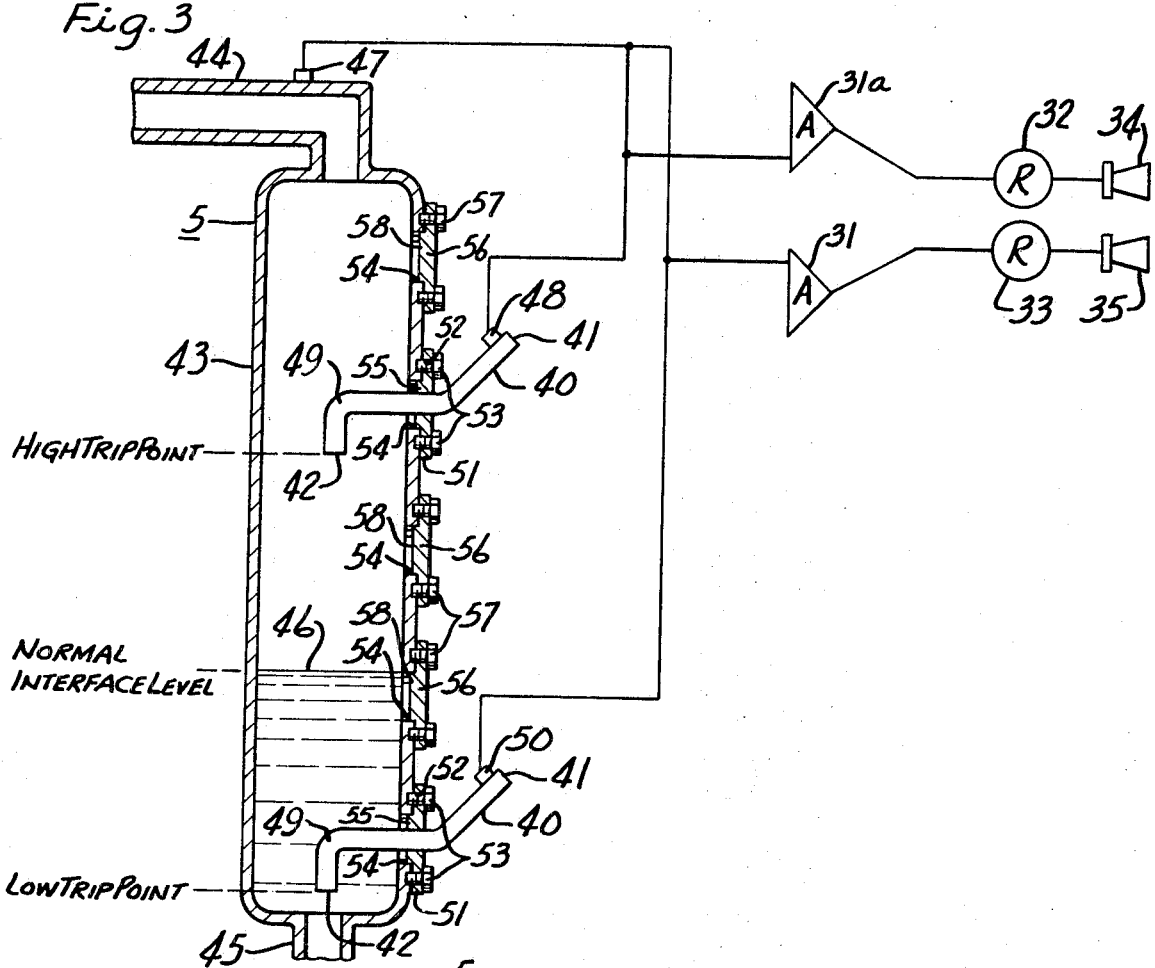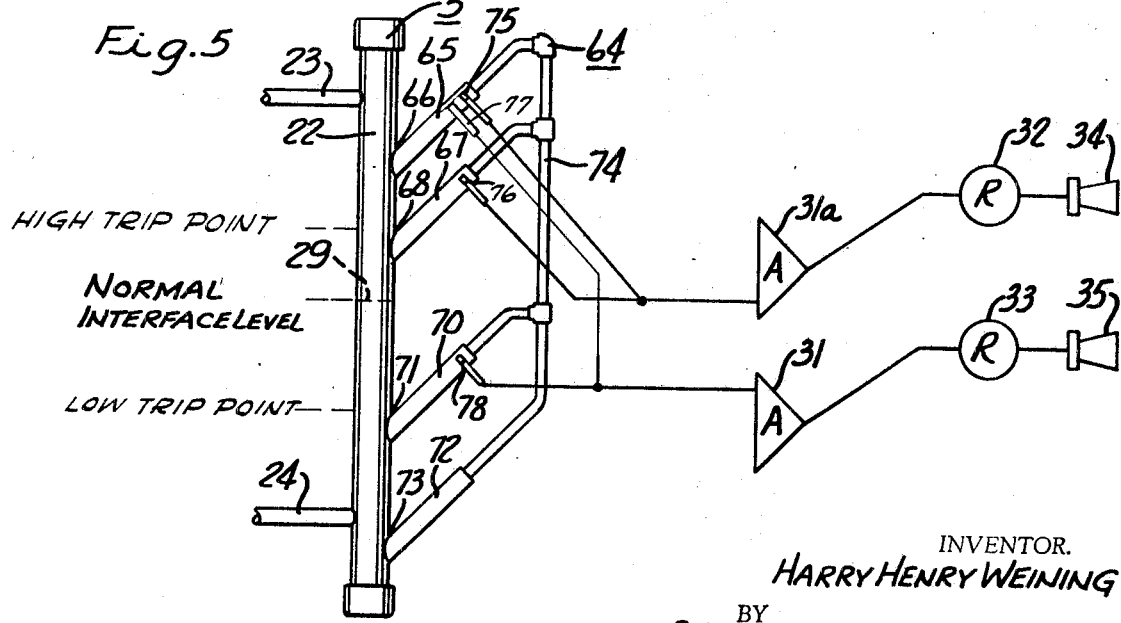

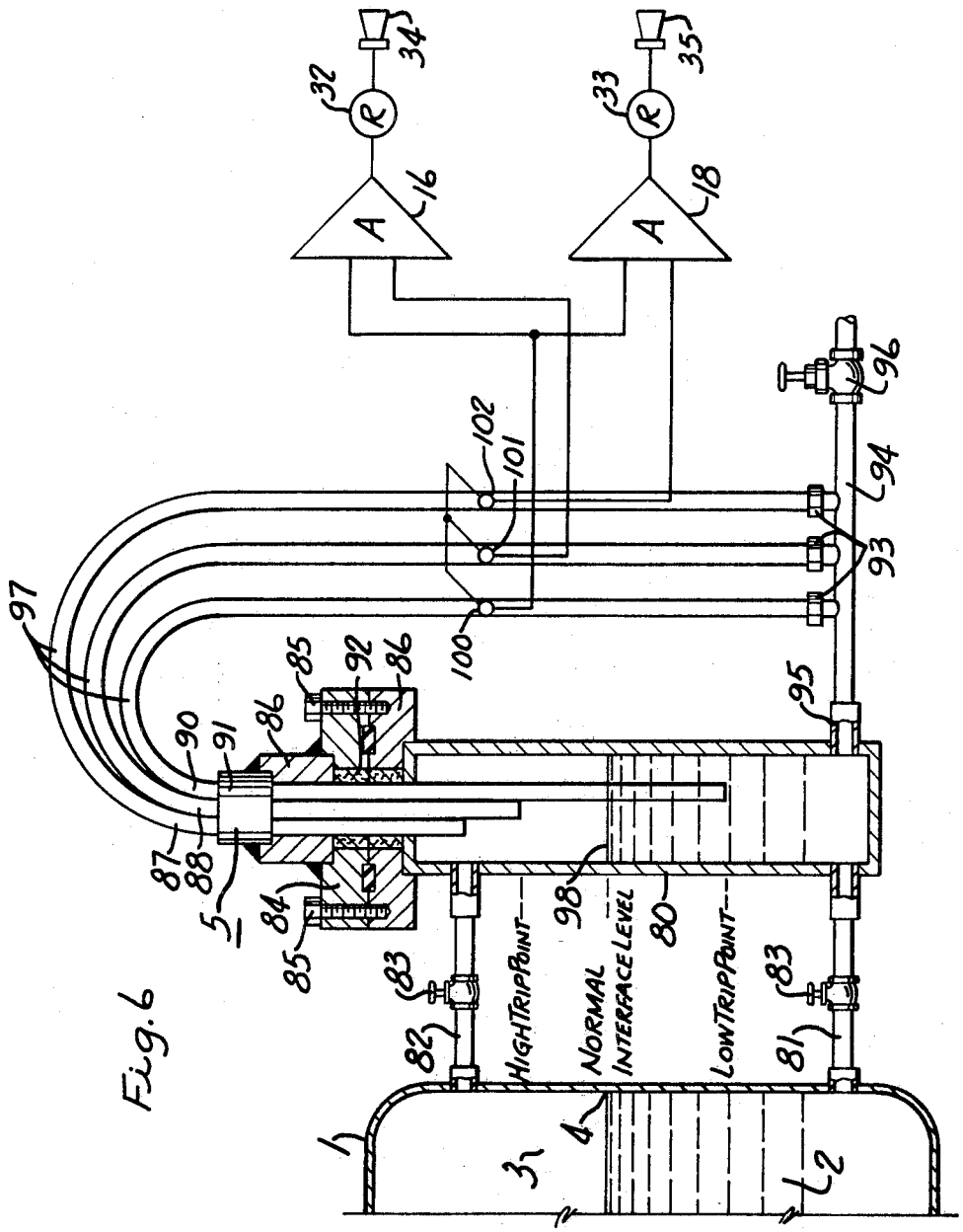

May 19, 1970  H. H. WEINING  3,512,412
LIQUID LEVEL INDICATING DEVICE
Filed Oct. 19, 1967  4 Sheets-Sheet 4
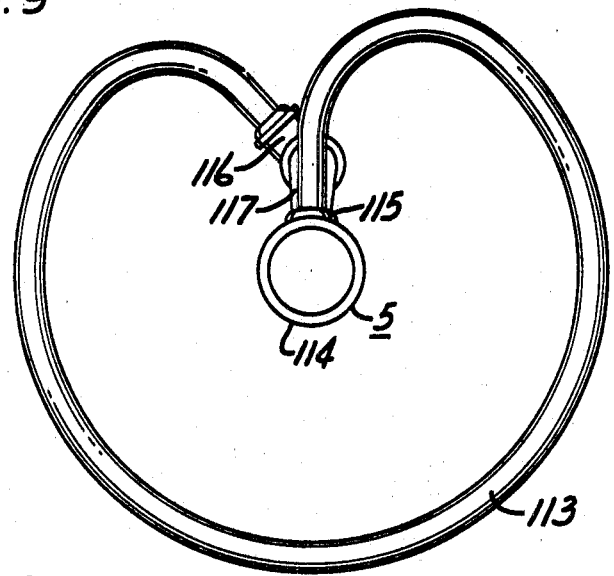
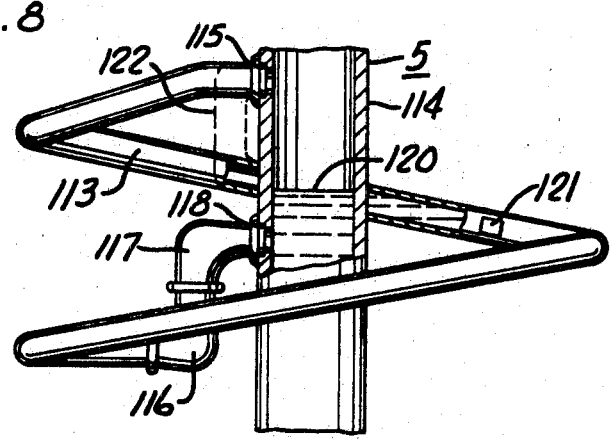
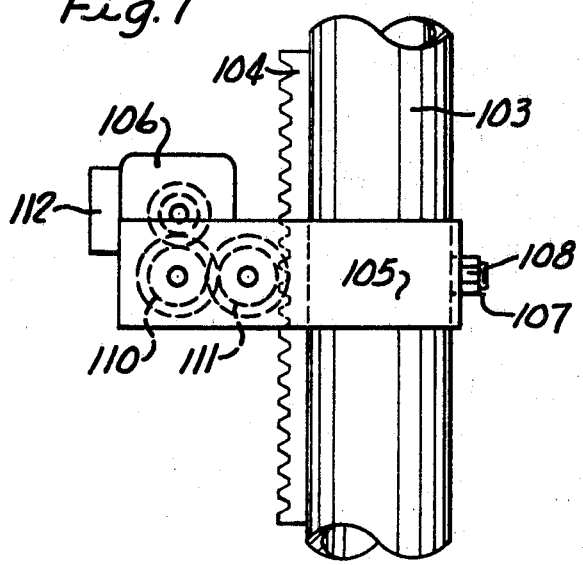
INVENTOR.
*Harry Henry Weining*
BY
*Carothers & Carothers*
*His Attorneys*

United States Patent Office 3,512,412
Patented May 19, 1970

3,512,412
LIQUID LEVEL INDICATING DEVICE
Harry Henry Weining, Erie, Pa., assignor, by mesne assignments, to Blaw-Knox Company
Filed Oct. 19, 1967, Ser. No. 676,558
Int. Cl. G01f 23/22
U.S. Cl. 73—295                          16 Claims

ABSTRACT OF THE DISCLOSURE

A liquid level sensing device to indicate, by alarm or other output means, the level of liquid in a vessel or chamber containing a liquid phase and a condensable gas phase utilizing a liquid column container connected to the vessel having a comparable liquid-vapor interface. The liquid level sensing device is characterized by fluid connecting means generally in the form of a small diameter tube which is exposed to the interior of the liquid column and has a predetermined position relative to the liquid-vapor interface to be monitored. Temperature sensing means are associated with the fluid connecting means to detect and signal when the liquid-vapor interface is above or below the predetermined position and, therefore, indicative of the interface level in the liquid column.

BACKGROUND OF THE INVENTION

Field of invention

This invention relates to measuring devices for determining the liquid level in a tank, vessel or chamber through the use of thermal sensing devices which are indicative of the liquid level in the vessel to be monitored. An example of such vessels are steam generators or evaporators wherein the liquid-vapor interface must be monitored to insure that a proper level of liquid is maintained in the vessel at all times.

Description of prior art

There are many kinds and types of liquid level alarm or indicating devices and systems known today. The simplest of such devices is a transparent liquid column connected in "parallel," so to speak, to the vessel to be monitored. Although such devices are accurate, they must be constantly attended and visually monitored by one on duty. This is not always possible.

Another type of device frequently used in boiler or steam generator vessels for determining the position of the liquid-vapor interface is the mechanical float, which rests on the liquid surface in the vessel and means are provided outside the vessel which are responsive to changes in movement of the float in the vessel.

Such devices are in need of frequent repair and in high pressure applications are mounted externally of the vessel to be monitored in external chambers hermetically sealed to the vessel. These chambers being external of the vessel being monitored become quite big and heavy and, therefore, expensive. Also, the high temperatures and liquid-vapor atmosphere greatly affects the mechanical operation of these devices requiring frequent periodical rehabilitation.

Another type of level sensing device is an electrical probe which may be either external of or projecting directly in the vessel to be monitored. These sensing devices present problems in properly sealing the probes to and within the vessel, especially where high pressure and temperature environments are present.

Other level alarm systems make use of the principle of identifying the liquid-vapor interface level in the monitored vessel by examining the vessel externally with X-rays or gamma rays from radioactive isotopes. Although such systems are effective, they are expensive and not warranted, especially where the monitored vessel installation is of a small size.

Still another type of liquid level indicator utilizes a thermal expansion tube element which expands and contracts, and its axial displacement is used as a means for indicating the level of the liquid in the monitored vessel. Such a type of liquid level indicator is in need of calibration with a signal indicating device in order to properly determine the various positions in the monitored vessel as compared to the various axial displacements of the expansion tube element and its accuracy is, therefore, never precise especially after continual use of the expansion element. The latter will necessitate recalibration periodically.

Some of the level indicators above referred to are responsive to pressure changes in the vessel as well as level changes which render a change in the latter precisely undeterminable as to when an actual level change is actually taking place and to what degree.

Still another type of liquid or fluid level indicating device is shown in Reicks 3,324,722 (73–295) which is directed to a probe device which has a helically formed fin embedded with a highly resistant conductive cable. The cable, thus, represents part of a Wheatstone Bridge and is calibrated to heat the fins to a selective temperature. Since the thermal conductivity of the fluid is greater than that of the gas, thereabove, the heat generated by the cable is conducted away from that portion immersed in the fluid as compared to that portion above the fluid in the gas. Thus, the temperature of the cable in the gas is maintained at a higher temperature, providing a temperature differential which will vary according to any change in the level of the fluid and be electrically sensed by the Wheatstone Bridge.

Thus, an independent heat source is required in order for this type of liquid level sensor to operate and the probe must be placed in the vessel in which the fluid level is to be measured subjecting the temperature sensing device to an oxidizing environment, if not corrosive, requiring the probe to frequent periodical rehabilitation.

SUMMARY OF INVENTION

The principal object of the present invention is the provision of a liquid level indicating device that does not have to be physically monitored in order to determine if the liquid level in a monitored vessel is being properly maintained. A signal is produced when the liquid-vapor interface of the monitored vessel is above or below a predetermined point.

The invention herein relies on the principle of sensing a temperature differential established in a fluid connecting means which is internally exposed to and connected across the liquid-vapor interface of a liquid column, the latter of which is connected to the vessel to be monitored. The fluid connecting means may take the form of a tube or a plurality of tubes, if need be, which are to act as heat radiating devices. The efficiency of such heat radiating devices is greatly improved if the ratio of the external surfaces to the internal volume is high. Such tubes, are, thus, of small diameter permitting the entrance of a small volume of fluid. At the same time, the fluid connecting means may be made of a material of low thermal conductivity so that heat along the wall of the connecting means will not be readily transferred from that part enclosing the hot gas phase to that portion enclosing the cooler liquid phase.

A fluid connecting means connected across the liquid-vapor interface of the liquid column will establish its own corresponding interface. For example, in monitoring a boiler vessel system, a fluid connecting means having its ends exposed into the interior of the liquid column, with the column interface intermediate of its connected ends, will permit the entrance of steam at the upper end and liquid at the lower end. Due to the large surface area as compared to the internal volume of the fluid connecting means, the steam in the upper end of the fluid connecting means will condense substantially isothermally, the heat being radiated from the fluid connecting means to the surrounding atmosphere. As the steam condenses, additional steam from the system will take its place and will, subsequently, also condense the process being continuous as long as the steam in its system is continually supplied to the liquid column and fluid connecting means. In view of this steam replacement, that portion of the fluid connecting means above the interface established therein will be maintained at a higher temperature, in view of the heat released by the condensing vapor as compared to the temperature of the liquid in the portion below the established interface in the fluid connecting means, which will be permitted to cool substantially to a temperature below the liquid temperature in the vessel being monitored. Thus, the liquid-vapor interface position within the fluid connecting means can be quickly detected in view of the temperature differential between that portion of the fluid connecting means above the interface established therein as compared to that portion of the fluid connecting means there below. Temperature sensing means are associated with the fluid connecting means in the sense that the same may be connected with the fluid connecting means by merely engaging the same, to detect a raising or lowering of the interface beyond predetermined and established fixed points. These temperature sensing means show an abrupt increase or decrease in temperature as the liquid-vapor interface established in the fluid connecting means would either descend below or ascend above the fixed point of position of the sensing means.

From the foregoing it will be readily apparent that the steam above the liquid-vapor interface in the fluid connecting means is permitted to readily condense into water; in doing so, its high heat content is distributed to the surrounding cooler atmosphere principally by radiation from a surface area of the fluid connecting means. This condensation permits more steam to flow into the steam area of the fluid connecting means resulting in continuous heat loss by radiation and, thus, condensation of the steam. The same is not true of the liquid below the liquid-vapor interface since the liquid is noncondensable and heat loss from the liquid will merely lower the liquid temperature. The condensed steam will settle into the liquid portion of the fluid connecting means to be slowly recycled back to the liquid column and the monitored vessel. Thus, the temperature below this interface will always be lower than the temperature found above the interface. The temperature sensing device will sense the temperature differential and produce a signal indicative of a movement of the liquid-vapor interface either ascending or descending in the fluid connecting means. Of course, the movement of the liquid-vapor interface in a fluid connecting means is indicative of a change in the liquid-vapor interface in the monitored vessel.

Another object of the present invention is the provision of a liquid level indicating device dependent upon each sensing means to produce a signal indicative of an ascent or descent of the liquid-vapor interface in a vessel being monitored.

Another object of the present invention is the provision of a liquid level indicating device which utilizes temperature sensing means which are responsive to temperature changes and accurately indicate the liquid-vapor interface level, regardless of pressure changes in the vessel being monitored. As is well known, for example, in a vessel containing a liquid and a vapor of that liquid, such as steam and water, the steam temperature will vary with the steam pressure. Thus, the sensing device will sense a lowering of temperature if the steam pressure falls. Also, the sensing device will sense a lowering temperature if the established liquid-vapor interface level ascends in the fluid connecting means. Thus, either event causing a decrease in temperature may produce a signal activating an alarm system. The former of these events is not indicative of a change in the liquid-vapor interface level; therefore, changes in steam pressure within the system must be compensated for in order that only the latter of such events is detected and the alarm system activated.

Pressure compensation is accomplished by the use of an additional heat sensing device positioned well above the expected maximum level of the liquid-vapor interface. The output of this sensing device is connected in series with that of the other heat sensing means so that the outputs are algebraically added together. The combined produced or generated signal of the series connected heat sensing means may be utilized to detect a temperature differential indicative of a change in the liquid-vapor interface level. A temperature differential caused by a pressure change in the vessel chamber being monitored will be cancelled out by the generated signals eliminating the possibility of any detection under such circumstances.

Another object of the present invention is the provision of fluid connecting means used in the detection of the liquid-vapor interface level within the vessel being monitored which is quickly responsive to any such level change at a predetermined set or fixed point. A quick response can be insured by the utilization of a "thermal trap" which may take the form of an upwardly extended loop in the fluid connecting means or the form of thimble tubes having one end exposed to the interior of the liquid column and the other ends sealed off and affixed to the sealed ends of the temperature sensing devices. Thus, when the liquid-vapor interface level begins to ascend in the fluid connecting means in a boiler system, the steam will be trapped in the "thermal trap"; and as the steam condenses, the liquid will rise in the "thermal trap" to fill the space previously occupied by the steam. It should be noted that in the case of the "thermal trap" in the form of an upwardly extended loop, liquid in the fluid connecting means will also ascend up into the trap. This liquid being cooler than the water drawn from the liquid column will bring about a faster overall response by the sensing device indicating that the liquid-vapor interface has reached the predetermined selected point in the liquid column.

The same is true where the liquid-vapor interface level descends in the liquid column in that a quick response by the heat sensing device will be accomplished quickly, since the steam will be allowed to rapidly enter the "thermal trap" as soon as the liquid level has fallen below the predetermined point where the fluid connecting means is connected to the liquid column and exposed to the interior thereof.

Another object of the present invention is the use of heat sensing means which are temperature sensors and are thermally responsive to any changes in temperature with respect to the fluid connecting means with which they are associated. Such sensing devices may either take the form of voltage generative devices such as thermocouples, or may be responsive-resistance changing devices such as thermistors or resistance bridges.

These heat sensing devices may be connected directly to the fluid connecting means at those points wherein the liquid-vapor interface level is to be detected. However, it is within the provision of the present invention to include an arrangement whereby such heat sensing devices are arranged to transverse the outside of the fluid connecting means to detect a thermal differential each time the sensing device passes the point of the liquid-vapor interface level established inside the fluid connecting means. In such a case, a graphical recording device may be calibrated relative to the established levels of the liquid-vapor interface in the fluid connecting means in order to graphically illustrate, over a period of time, the changes in the liquid-vapor interface level in the vessel being monitored.

Another object of the present invention is the provision of a liquid level indicating device which is simple in construction and basically having no moving parts which must be either recalibrated or rehabilitated. Furthermore, none of the parts comprising the liquid level indicating device of this invention are found in the internal system of the vessel being monitored. Thus, the present invention can be easily adapted to monitor the liquid level of vessels already in operation.

It should be understood that the present invention is not limited to detect the liquid-vapor interface level in monitored vessels containing saturated vapor of the liquid at temperatures above the ambient atmospheric temperatures. For example, the liquid level indicating device comprising this invention could be utilized to detect the level of aqueous solutions in the evaporators of a vacuum system maintained at relatively low temperatures or evaporators for liquids which boil at subatmospheric pressures. In this particular example, however, the fluid connecting means would have to be protected in a cool enclosure such as a refrigerated coil surrounding the same in order to obtain effective heat transfer from the fluid connecting means enabling the heat sensing device to sense a change in temperature within the fluid connecting means. Such a refrigerated chamber surrounding the fluid connecting means is necessary under such conditions since the ambient atmospheric conditions would be much warmer than the fluid connecting means.

In connection with the above example, it is also within the scope of the present invention to apply such a refrigerating chamber to the fluid connecting means of a liquid level indicating device utilized in connection with a boiler system, although the vapor temperature established in the upper portion of such fluid connecting means would be much higher than the ambient atmospheric temperature. Under such conditions, the cooling of the liquid containing portion of the fluid connecting means may be greatly accelerated and, thus, intensify the temperature differential established at the liquid-vapor interface level and as a result, providing a liquid level indicating device being quickly responsive to any changes in the liquid-vapor interface level.

The liquid level indicating device of this invention, by the same token, could be insulated as well as cooled or refrigerated and sealed within a jacket for insertion in the monitored vessel.

Other objects and advantages appear hereinafter in the following description and claims.

The accompanying drawings show for the purpose of exemplification, without limiting the invention or claims thereto, certain practicable embodiments illustrating the principles of this invention wherein:

FIG. 1 shows the liquid level indicating device comprising this invention in its simplest form.

FIG. 2 is the modified form of the structure shown in FIG. 1 utilizing more than one liquid level sensing device indicative of more than one change in position of the liquid-vapor interface level utilizing the "thermal trap" principle.

FIG. 3 is the modified form of the liquid level indicating device comprising this invention utilizing a simplified form of the "thermal trap" principles and means for varying the trip point.

FIG. 4 is another form of the liquid level indicating device comprising this invention which is compensated to eliminate the detection of temperature changes within the system caused by a pressure change in the system, the fluid connecting means being looped at their lower extent.

FIG. 5 is another form of the liquid level indicating device comprising this invention utilizing the principles established in their structures as shown in FIG. 2 and FIG. 4.

FIG. 6 is the modified form of the liquid level indicating device of FIG. 5 utilizing a series of fluid connecting means.

FIG. 7 depicts the application of a heat sensing means moveably associated with the fluid connecting means of the liquid level indicating device comprising this invention.

FIG. 8 is a further form of the liquid level indicating device comprising this invention wherein the fluid connecting means is in the form of a helical tube.

FIG. 9 is a plan view of the structure of the liquid level sensing device of FIG. 8.

In FIG. 1 there is shown the simplest structure comprising this invention wherein the vessel 1 to be monitored contains a liquid phase 2 and a gaseous phase 3 which is in the form of a condensable vapor of the liquid phase. The liquid phase 2 and the vapor phase 3 form the liquid-vapor interface 4 in the vessel 1, the level of which may rise or descend in the vessel 1 depending upon the demands made therein for use of either the liquid or gaseous vapor phase 2 contained in the vessel.

The liquid level sensing device 5 comprising this invention is shown in FIG. 1 connected to the vessel 1 to be monitored through the upper and lower connecting tubes 6 and 7, respectively and comprises the liquid column container 8, the upper end of which is connected to gaseous vapor supply tube 6 and the lower end of which is connected to liquid supply tube 7. Since the liquid column container 8 is connected across the interface level 4 of the vessel 1, the same interface level will appear within the liquid column 8 as indicated at 10.

The fluid connecting means 11 is connected to the liquid column container 8 and comprises a small diameter tube the ends of which are exposed into the interior of the liquid column container 8. As in the case of the liquid column container 8, the fluid connecting means 11 is connected across the liquid-vapor interface of the former so that the interface level 12 will also appear in the fluid connecting means 11. As mentioned, the fluid connecting means 11 is of small diameter in order that it will have a high ratio of tube surface as compared to internal volume. Thus, the amount of gaseous vapor entering the upper portion of the fluid connecting means 11 from the liquid column container 8 will be of small amount as compared to the tube surface that comes in contact with this portion of the fluid connecting means. The fluid connecting means is constructed to have a high surface to volume ratio in order that it will act as a heat radiating device. That portion of the vapor or condensable vapor phase permitted to enter the upper portion of the fluid connecting means contacts the tube conducting surface permitting a large amount of heat to be conducted from the walls of the tube and radiated away into the atmosphere surrounding the fluid connecting means.

It will be noted that upon monitoring the vessel 1, as for example in the case of a steam generator, the steam generated in the vessel 1 will be permitted to pass through the connecting tube 6 into the upper portion of the liquid column container 8 and thence a portion of this steam will flow into the upper portion of the connecting tube 11. In view of the high ratio of surface area in the connecting tube 11, steam will condense isothermally and its condensate will flow into the lower portion of the fluid connecting tube 11. The heat released by this vapor as it condenses maintains the temperature of the upper portion of the connecting tube 11 at a constant level, such condensation occurring at such rate which supplies all the loss of heat due to radiation from the surface of the connecting tube. This temperature level is maintained as long as the vapor or steam is permitted to enter the upper portion of the connecting tube 11.

Below the established interface 12, in the fluid connecting means 11, the temperature will be lower compared to that of the steam above, since the hot water in the lower part of the tube, which is the sole source of heat radiated from the tube below the interface level, can supply heat as radiated by a loss of its sensible heat; i.e., by cooling of the hot water to a temperature below that of which the steam is condensed in the upper part of the tube 11.

Thus in summary, the principal feature of the present invention is the provision of the fluid connecting means 11 comprising a small diameter tube which is connected across the interface level to be monitored and permitted to receive the liquid phase as well as the condensable gas phase of the fluid contained in the monitoring vessel. The tube being of small diameter will have a high ratio of tube surface as compared to its internal volume, thus exposing the fluid contained in the tube to direct contact with an efficient heat radiating surface. Since a condensable vapor phase of the fluid is involved, the temperature of the upper portion of the tube above the established interface will be related to the saturated vapor temperature, and will be higher than the temperature of the portion of the tube below the interface level as the heat radiated from the lower portion is not replaced and its temperature remains at a lower value.

As shown in FIG. 1, temperature sensing means 13, 14 and 15 are shown connected in three different positions to form a portion of the liquid level sensing device 5. The temperature sensing means 13 is a temperature reference sensing device while temperature sensing means 14 is a high level sensing device connected at a desired point along the upper portion of the fluid connecting means 11 above the interface level 12, whereas the temperature sensing means 15 is connected to the fluid connecting means at a desired point along the lower portion of the same below the interface level 12. The temperature sensing means 13, 14 and 15 may be in the form of thermocouples but also may be temperature resistance devices such as thermistors. The reference sensor 13 is connected to each of the temperature sensing means 14 and 15 which in turn are electrically connected to circuit means in the form of an amplifier and relay system.

As it readily may be understood, the temperature sensing device 14 is connected to that portion of the fluid connecting tube 11 above the interface level 12 and is termed as a high level sensing device in that upon the interface level 12 reaching the position where this temperature sensing device is connected to the fluid connecting tube 11, the temperature sensing device 14 will be actuated to produce a signal indicative of the interface rise in the fluid connecting tube. For this reason the reference temperature sensor 13 is well above the expected maximum level of the interface level and being electrically conducted to the high level sensor 13, the signals generated by these sensing devices would be the same under the normal conditions shown in FIG. 1 since the temperature at these points of the level indicating device 5 would be the same. The generated signal of the sensor 13 would be algebraically added to that of the sensor 14 to produce an electrical output of zero. Upon the rising of the interface level 12 within the fluid connecting tube 11 to the position of the high level sensor 14, there would be a change in the temperature at this particular point since the liquid phase is cooler than the vapor phase as previously explained. As a result of this difference in temperature, there will be a corresponding change in the electrical output of temperature sensing device 14 and as a result the algebraic signal imposed upon the terminals of the amplifier 16 will be a positive value which signal, upon amplification, will energize the relay coil 17 which can be connected to operate any signal device which may be a visual indicator such as a lamp or an audio sounding device such as a horn or other alarm.

The amplified signal may be used to operate a solenoid or motor operated valve where the level in the monitored vessel becomes too high or too low. For example, when the level in a steam generator becomes low in the monitored vessel, thermal sensor 15 will be activated to close a solenoid operated valve to shut off the fuel oil supply to the burners of the steam generator. By the same token, the signal output could be used to control the liquid supply to the monitored vessel as, for example, where the interface level becomes low in the vessel, the admission valve to the vessel is opened until the desired level is obtained at which time the signal of a temperature sensor at this level operates to close the admission valve.

The lower level sensing device 15 works in the same manner as the high level sensing device 14 except that when the level of the interface 12 reaches the point in the fluid connecting tube 11 where the lower temperature sensing device 15 is connected, the output of this sensing device relative to the reference sensor device 13 will become zero. Under normal conditions where the interface level is at its desired position, a constant algebraic positive output would be present in view of the difference in the higher degree of temperature sensed by the reference sensor 13 as compared to that of the lower sensing device 15.

In this connection the lower temperature sensing devices 13 and 15 may be connected to an amplifier 18 which in turn is connected to the coil 20 of, for example, a signal relay or a solenoid device. Thus, it would be readily understood that under normal conditions wherein the interface level 12 in the fluid connecting tube 11 is above the point of connection of the lower temperature sensing device 15, a constant electrical output will be amplified by the amplifier 18 which in turn will energize the signal relay coil 20. The signal relay coil 20 may be connected to a relay having a normally closed contact so that, upon the interface level 12 descending below the connected point of the temperature sensing device 15, the algebraic output of the temperature sensor 13 and that of the low temperature sensor 15 will become zero, de-energizing the relay 20 and thus permitting the closing of the contact of the relay to complete the circuit of the alarm sylstem.

In the case of the high temperature sensing device 14, the relay associated with the relay coil 17, for example, may have a normally open contact. Upon energizing of the relay coil 17 due to an increase in the interface level 12 in the fluid connecting tube 11, the normally open contact of such a relay will be closed to complete a circuit for actuation of an alarm system or solenoid valve, whatever the case may be.

The above explanation is merely for purposes of explaining an actual embodiment of an electrical system that may be used in connection with the liquid level sensing device 5 comprising this invention there being a multitude of various forms of which the signal from the temperature sensors 13, 14 and 15 may be received and transformed to produce a signal from which a change in the interface level may readily be determined, either visually or audibly. The simplest form of such a circuit and alarm system has been utilized since the principal features comprising this invention lie in the device used to create a temperature differential from which the level of the liquid-vapor interface to be monitored can be readily determined by sensing the temperature differences along the surface of the fluid connecting means.

The reference sensing device 13 is a desired element in the present invention, since without it, the liquid level sensing device 5 would be responsive to temperature differences not only resulting from a change in the liquid-vapor interface level being monitored but also because of pressure changes in the monitored vessel. It is well known that in a vessel containing a liquid and a gaseous vapor of that liquid, such as steam and water, the temperature of the vapor will vary with the vapor pressure, so that in the present situation without the reference sensing device 13, a change in the vapor pressure would also produce a signal indicative of a temperature change but not indicative of a change in the liquid-vapor interface level. The reference sensor 13 being connected in series with the high level sensing device 14 and the low level sensing device 15 prevents the actuation of the alarm system when there is a mere change in vapor pressure. For example, a change in the vapor pressure in the vessel in FIG. 1 will also result in a vessel vapor change in the upper portion of the fluid connecting tube 11. Assuming that the interface level 12 is in the position as shown, the change in the electrical output of the sensing device 13 will be no different than that of the sensing device 14 since the temperature at the points of these sensing devices will be the same.

As previously indicated above, the reference sensor 13 may be secured in any position at any point above the expected maximum level of the interface 12. As such, it may be located as shown in FIG. 1 on the connecting tube 6 or even placed on the upper portion of the liquid column 8 or, for that matter, at the extreme upper end of the fluid connecting means 11.

FIG. 2 is another form of the liquid level sensing device comprising this invention wherein the liquid level sensng device 5 comprises the liquid column container 22 having the upper vapor phase connecting tube 23 and the lower liquid phase connecting tube 24, which tubes are connected across the interface level of the vessel to be monitored. Two fluid connecting means are provided in the form of the upper radiating tube 25 and the lower radiating tube 26. The upper radiating tube 25 provides the heat radiating tube for the high level trip point whereas the heat radiating tube 26 provides the low level trip point. The upper heat radiating tube 25 is connected internally to the liquid column container 22 substantially above the interface level 29 whereas the lower heat radiating tube 26 is positioned below this normal level 29 of the liquid-vapor interface.

Reference has been made to the "trip point" which is defined as the desired point in the liquid column wherein the liquid-vapor interface level is desired to be detected. The trip point is not necessarily the same point where the temperature sensing device may be connected to the fluid connecting means since the exact position of the temperature sensing device in certain embodiments of this invention need not be at the desired position in which the liquid-vapor interface level is to be detected as will be apparent hereinafter.

In FIG. 2, the employment of two heat radiating devices provides better sensitivity at the desired trip point by eliminating the use of a long length of tubing to be used as a single heat radiating device. In the case of a long heat radiating device, when the liquid-vapor interface reaches a lower level, the vapor condensate may become a significant amount in its replacement of cooler liquid that may remain in the lower portion of the heat radiating tube. As a result, the condensate may bring more heat into the interface area than can be readily radiated therefrom in view of the small surface area of the heat radiating tube containing liquid. As a result, the temperature of the liquid near the interface will be a higher temperature than normally expected and substantially close to that maintained at the tube surface above the interface level. The desired trip point will be uncertain since the heat radiating tube temperature below as well as above the interface level will be substantially the same. The utilization of two shorter heat radiating tubes 25 and 26 in FIG. 2 overcomes the possibility of this problem, above set forth, since in the short tubes 25 and 26, the condensate from the vapor phase above the interface level will not be as great an amount in these tubes and will not be permitted to form its condensate as fast as in the case of employment of longer tubes as fluid connecting means.

As shown in FIG. 2, the thermal sensors 27, 28 and 30 are electrically connected to the amplifiers 31 and 31a which in turn are connected, for example, to the relays 32 and 33 to operate the alarm devices 34 and 35, respectively, when conditions are such that the sensors 27, 28 and 30 provide an electrical output to operate the relays 32 and 33.

Temperature sensor 27 is a temperature reference sensor and is connected in series with the temperature sensor 28, the high level sensor, and the temperature sensor 30, the low level sensor. The high and low level sensors 28 and 30 are connected to the upper portions of the heat radiating tubes 25 and 26 and are secured to these tubes in any suitable manner. As explained above, the reference sensor 27 is correlated with the signals produced by the temperature sensors 28 and 30 not only to produce the desired algebraic signal when the interface level 29 either reaches the high trip point or the low trip point but also compensates for any changes of pressure in the monitored vessel. The use of the reference sensor 27 eliminates any effects that pressure changes in the monitored system may have on the corresponding change in temperature, since such pressure changes do not normally affect or involve a change in the interface level.

Another important feature of the embodiment shown in FIG. 2 is the utilization of a "thermal trap" which is in the form of the upward extending loop 36 at the upper end of the heat radiating tubes 25 and 26. The use of the upward extending loop 36 in the fluid connecting means insures a quick response by the temperature sensing devices 28 and 30 in detection of a change in the liquid-vapor interface level 29. For example, when the liquid-vapor interface level 29 begins to ascend in the liquid column container 22, as well as in the vessel being monitored and the tube 25, the rising level will eventually cover the upper connection 37 of the heat radiating tube 25 and thus, entrap the gaseous vapor in the upward extending loop 36. At the same time, the liquid in tube 25 from its lower connection 38 is sucked in to fill the space previously occupied by the vapor as the latter condenses. This liquid will be somewhat cooler than that liquid entering the upper connection 37 of the same tube and the resulting mixture which comes in contact with the point at which the temperature sensor 28 is connected brings about a quick response by this temperature sensing device indicating that the liquid-vapor interface level has reached the predetermined selected high trip point. It should be noted that the liquid will rise rapidly into the tube loop 36 through the connection 37 and tube 25 to replace the vapor as it rapidly condenses.

When the liquid-vapor interface level 29 descends in the liquid column container 22, the heat sensing device 30 will quickly respond since the vapor will be allowed to rapidly enter the upward extending loop 36 of the heat radiating tube 26 at its upper connection 37 as the liquid level has fallen below this point.

It should be noted that the upward extending loop 36 to form the thermal trap rises upwardly well above the point of entry 37 and the temperature sensors 28 and 30 may be installed in a vicinity near the high point of the loop 36.

FIG. 3 shows another embodiment of the liquid level indicating device utilizing the thermal trap technique which comprises the thimble tubes 40 which are closed at their outer end 41 with their other end 42 exposed to the interior of the liquid column container 43. The liquid column container 43 has its upper end connected to the pipe 44 and its lower end connected to the pipe 45 which in turn are connected across the liquid-vapor interface of the vessel to be monitored thereby establishing the same liquid-vapor interface level 46 in the liquid column container 43.

The temperature sensor 47 is the reference sensor and is shown connected to the connecting pipe 44 and the temperature sensor 48 represents the high level sensor at the high trip point whereas the temperature sensor 50 represents the low temperature sensing device at the low trip point. As previously explained, these sensors are connected in series and connected together to the amplifiers 31 and 31a which in turn are connected to the relays 32 and 33 to respectively actuate the alarm devices 34 and 35.

The thimble tubes 40 operate as a thermal trap substantially in the same manner as the upward extending loop 36 in heat radiating tubes 25 and 26 of FIG. 2. The thimble tubes 40 are of small diameter in order to act as efficient heat radiating devices and thus, having a high ratio of surface area as compared to internal volume.

The upper thimble tube 40 may have a downwardly curved section 49 inside the chamber of the liquid column container 43. The elbow section 49 of the thimble tube 40 may be projected downwardly into the chamber of the liquid column container 43 at a desired length in order to selectively vary the desired position of the trip point wherein the interface level 46 will either ascend above or descend below the opening 42 of the elbow section 49. The liquid level sensing structure of FIG. 3 provides two alternative modes to vary the trip point; first, to selectively position the base plate 51 with its corresponding thimble tube 40 in a different opening 54 along the length of the liquid column container 43 or, secondly, replace the thimble tube 40 with another thimble tube having a downwardly extending elbow section 49 of a different length, the length of the elbow section 49 being determinative of the desired trip point.

As the interface level 46 being monitored ascends in the liquid column container 43, the same will eventually cover the opening 42 of the upper thimble tube 40 shown in FIG. 3 and the vapor trapped in the thimble tube 40 will readily condense enabling the liquid to be drawn quickly up into the upper thimble tube 40, which is the same phenomenon in connection with the structure of FIG. 2 upon arising of the interface level 29 after the same has passed the point of the upper point of entrance 37 of the upper heat radiating tube 25.

As the interface level 46 descends in the liquid column container 43, the lower thimble tube 40 having been filled with the liquid being monitored, will suddenly empty as the liquid level interface 46 proceeds below the opening 42 of the lower thimble tube 40. As the tube 40 empties of the liquid, it will simultaneously quickly fill with the gaseous vapor which will actuate the temperature sensor 50 causing the same to produce an electrical signal equal to that of the reference sensor 47 and thus imposing algebraically sum of the voltage generated by these sensors being zero on the amplifier 31 which in turn will operate the relay 33.

An important feature of the liquid level sensing device 5 in FIG. 3 is the employment of removable thimble tubes 40 so that one may selectively vary the position of the high and low trip points in the liquid column container 43 by removing the thimble tubes to another position along the vertical length of the liquid column. As shown, the thimble tubes 40 are secured to the base plates 51 which have openings 52 to receive the bolt members 53, which secure the base plate 51 to the liquid column container 43. Various openings 54 are provided along the longitudinal length of the liquid column container 43 and the cap portion 55 of the base plates 51 is received in the opening 54 as the plate is secured by the bolt members 53 to the liquid column container 43. As to those openings 54 in the liquid column container 43 which are not desired to be used as trip points, a plain base plate 56 is utilized which is secured to the liquid column container 43 by the bolts 57. The base plate 56 also has a cap portion 58 which fits into the opening 54 to hermetically seal the opening and prevent the escape of the gaseous vapor or liquid that may be present in the liquid column container 43. Thus, each of the base plates 51 and 56 must hermetically seal each of the openings 54 and, if desired, a gasket or other sealing means may be used around the caps 55 and 58 to insure this hermetic sealing.

It should be emphasized at this point that the temperature sensors of the type shown in FIGS. 1, 2 and 3 may not only be of the thermocouple type as shown in these embodiments, but also resistance bridges as well as strain gauges or thermistors. The amplifiers 16, 18, 31 and 31a may be of the low level signal type responsive to the temperature sensor signals.

The liquid level sensing device 5 of FIG. 4 is similar in all respects to that of the type shown in FIG. 2 except the reference sensor 27 is connected at the vicinity of the closed end of the thimble tube 60 and high temperature sensor 28 and the low temperature sensor 30 are connected to fluid connecting means comprising the upper heat radiating tube 61 and the lower heat radiating tube 62, each of which have a downward extending loop 63 in their lower portion which extends below the lower connection point 38 of each of the heat radiating tubes 61 and 62.

The reference sensor thimble tube 60 is connected to the liquid column container 22 at 59 well above the expected maximum rising level of the liquid-vapor interface. The downward extending loop 63 of the heat radiating tubes 61 and 62 insure that there always remains cool liquid in a fluid connecting means. The loops 63 prevent hotter liquid in the liquid column container 22 from circulating or entering into the parallel connected heat radiating tubes 61 and 62. The coolest liquid in the heat radiating tubes will settle into the bottom of the loops 63 and stet from above the established interface in the heat radiating tubes 61 and 62 will gradually in its liquid form displace the cooler liquid in the loops 63. However, the liquid in the liquid column container 22 will not flow into the heat radiating tubes 61 or 62 at their lower connections 38. The use of the downwardly disposed loops 63 aid in insuring a quick response of the temperature sensing devices 28 and 30 in establishing a more explicit and exact temperature differential above and below the established interface level that may be present in either of the heat radiating tubes 61 and 62, depending upon the location of the interface level 29 in the liquid column container 22.

The liquid level sensing device 5 of FIG. 5 is again similar to the structures as shown in FIG. 2 and FIG. 4 in that the liquid column container 22 has the upper and lower parallel connections 23 and 24, respectively. However, the fluid connecting means comprises the small diameter tube network 64 which comprises the upper reference tube 65 connected to the liquid column at 66, the high level heat radiating tube 67 connected at 68 to the liquid column, the low level heat radiating tube 70 connected at 71 to the liquid column. The vertical tube 74 connects each of the other ends of the tubes 65, 67 and 70 to form a closed circulatory path, fluid connecting means. Thus, the embodiment as shown in FIG. 5 is similar in operation to that shown, for example, in FIG. 2, except with the fluid connecting means being connected together to form a single return circulatory fluid system. The fluid connecting network 64 permits condensed vapor from the upper sensing devices to by-pass the lower sensing devices and return to the bottom of column container 22 and thus enhances the reduction of temperature due to radiation from the branches 67, 70 and 72. Allowing the condensate to return to the bottom of column container 22 through tube 74 instead of returning through tubes 67 and 70 allows the latter tubes to cool better.

It will be noted in FIG. 5 that there are two sensing devices employed on the high level tube 67—the high level sensing device 76 and a second reference sensing device 77. In this particular application, the high reference sensing device 75 on tube 65 is connected in series with the high level sensing device 76 both of which are connected sensing devices are sensing different temperature sensing device 78 is connected in series with its low reference sensing device 77 on tube 65 which in turn is connected to the amplifier 31. It can be seen that the low level alarm is in an off condition when its series connected sensing deviecs are sensing different temperatures. When the liquid level reaches the low level trip point, the series connected sensing devices 77 and 78 will approach equality in their temperatures sense, sounding the low level alarm. The high level sensing devices 75 and 76, on the other hand, will sound the high level alarm when the liquid level reaches the high trip point causing the high reference sensing devices 75 and 76 to sense a temperature differential therebetween sounding the high level alarm.

In FIG. 6 there is shown a further embodiment of the liquid level sensing device 5 comprising this invention which comprises the liquid column container 80 having the lower connecting pipe 81 and the upper connecting pipe 82 for connection to the monitored vessel. A valve 83 may be placed in the connecting pipes 81 and 82 to disconnect the liquid and gaseous vapor supply to the liquid column container 80 if need be, such as in the case where the liquid level sensing device is to be disconnected from the connecting pipes 81 and 82 to the monitored vessel.

The liquid column container 80 has a removable flange cover 84 which is secured by the bolts 85 to the flange plate 86 secured to the top of the liquid column container 80. The flange cover 84 is provided with a socket 86 through which passes the three heat radiating tubes 87, 88 and 90 which comprise the fluid connecting means. The radiating tubes 87, 88 and 90 are secured, such as by welding, in the coupling 91 which, in turn, is secured, such as by welding, to the flange plate 84. To insure that the flange cover 84 properly seals the entrance of the fluid connecting tubes 87, 88 and 90 into the interior of the liquid column container 80, the gasket 92 is provided between the flanges 84 and 86. This insures a hermetic seal between the flange cover 84 and the socket 86.

The other ends of the fluid connecting tubes 87, 88 and and 90, are secured by the couplings 93 to the horizontally disposed return pipe or tube 94 which in turn is internally connected to the liquid column container 80 at its lower end through the coupling 95. The other end of the return pipe 94 has the valve 96 for purposes of "blow down," that is, for removal of the liquid and gaseous vapor present in the liquid level sensing device 5 after the valves 83 in the upper and lower pipe connections 82 and 81 have been closed.

It will be noted that the principle of the thermal trap of the type shown in FIG. 2 is utilized in a somewhat similar form in the series of fluid connecting means of FIG. 6 wherein each of the heat radiating tubes 87, 88 and 90 have an upward extending loop 97 extending out of the top of an above the level of the liquid column container 80. Thus, the structure of FIG. 6 differs from the previously described structures in that the upper connection of the fluid connecting means to the liquid column container is through the upper end of the liquid column container 80 rather than into the side wall of the column. The trip point is determined by the extended length of each of the fluid connecting means downwardly into the chamber of the liquid column container 80. In this connection the heat radiating tube 87 only extends a short way into the chamber of the liquid column container 80. On the other hand, the low level heat radiating tube 90 extends a substantial distance down into the chamber of the liquid column container 80 below the normal liquid-vapor interface level indicated at 98. The downward extended length of the heat radiating tube 88 is approximately midway between that of the heat radiating tubes 87 and 90 and represents a high level trip point of the liquid level sensing device 5 of FIG. 6.

The extended length of the heat radiating tubes 88 and 90 downwardly into the chamber of the liquid column container 80 is selectively positioned depending upon the desired trip points, which corresponds to the liquid-vapor interface levels wherein it is desired that an alarm is actuated to give warning that the liquid-vapor interface level 4 has become too low or too high. In this connection, the heat radiating tubes may be cut shorter or lengthened in order to reposition the desired trip points of the heat radiating tubes 88 or 90.

Each of the temperature sensing devices 100, 101 and 102 are connected respectively to each of the heat radiating tubes 90, 88 and 87. As mentioned previously, any suitable means may be utilized to connect the temperature sensing devices to the heat radiating tubes. For an example, the temperature sensing devices may be in the form of a gasket thermocouple having a lead wire, the gasket thermocouple being secured to the heat radiating tube by means of a threaded stud welded to the tube and secured in place by a nut. On the other hand, depending on the desired application, the temperature sensing device may be made to readily move along the surfaces of the heat radiating tubes as hereinafter explained in connection with FIG. 7.

As shown in FIG. 6, each of the temperature sensing devices 100, 101 and 102 may be positioned relatively at the same height along the vertical length of each of the heat radiating tubes 90, 88, 87, respectively, as long as they are above the high trip point. In actual operation, as the interface level 98 rises and encloses the lower end of the heat radiating tube 88 in the chamber of the liquid column container 80, a thermal trap is formed, in that the condensable vapor of the liquid being monitored will not be permitted, thereafter, on a continuous basis, to enter into this tube. Thus, the condensable vapor entrapped in the upwardly extending loop 97 of the heat radiating tube 88 will condense into its liquid form and, as a result, a large portion of its heat content will be radiated from the tube 88. The loss of heat will not be able to be replenished due to closure of the lower end of the heat radiating tube 88, and there will be still further heat loss from the tube at which time the temperature sensing device 101 will sense a temperature change providing a voltage differential relative to the reference temperature sensing device 100 producing a signal for amplification by the amplifier 16.

The same application is true with respect to a falling or descending interface level 98 below the opening of the heat radiating tube 90 in the chamber of the liquid column container 80. If the interface level 98 proceeds below the opening of this tube, gaseous vapor present in the column is permitted to escape into the heat radiating tube and thus raising the temperature of the tube. As the interface level 98 remains below the opening of the heat radiating tube 90, additional gaseous vapor is permitted to enter tube 90 so that a high heat loss from the tube is established and remains substantially constant. As a result, the thermal characteristics of the temperature sensing device 102 are affected and its output algebraically compared to the output of the reference temperature sensing device 100 will impose an output of zero voltage on the amplifier 18 which permits the normally open relay 33 to close a back contact in an alarm circuit to actuate the alarm 35.

In the particular embodiment of the structure as shown in FIG. 6 it should be noted that it is not necessary that the interface established in any of the consecutive heat radiating tubes 87, 88 and 90 be established at the point of connection of the temperature sensing devices 100, 101 and 102 to the heat radiating tubes. Thus, from this standpoint it is clear that as soon as the supply of condensable vapor is cut off from entering any one of the heat radiating tubes, the constant heat loss supply, as originally supplied through an open lower end of these tubes, will be cut off causing a temperature change to take place at the surface of the heat radiating tube affected, which temperature change is sensed by the temperature sensing device connected to the tube. The particular trip point is determined by the downward extended length of any one of the heat radiating tubes into the chamber of the liquid column container 80 and not necessarily the location of the temperature sensing device on the heat radiating tubes unless they are positioned below the high trip point.

As shown in FIG. 7, it may be desired that the temperature sensing devices be movable along the surface of any of the fluid connecting means described in FIGS. 1, 2, 4, 5 or 6 to detect the degree of temperature differences along the surface of the tube to give an indication of the changes in the interface level over a period of time. A small diameter heat radiating tube 103 has connected thereto the gear rack 104 longitudinally along the surface of the tube. The traveling temperature sensor carriage 105 comprises a framework which supports a small AC reversible motor 106 and the traveling temperature sensor 107. The carriage 105 is constructed so as to encompass the heat radiating tube 103. The temperature sensing device 107 is secured to the carriage frame 105 through an opening in that part of the carriage encompassing the heat radiating tube 103 and secured in the carriage opening by means of the nut 108.

As mentioned, the motor 106 is supported on the carriage 105 and drives the gear reducer 110 which in turn drives the pinion gear 111 that drives the carriage on the gear rack 104 to move the carriage upwardly and downwardly along the length of the heat radiating tube 103.

Thus it is within the scope of this invention that the temperature sensing device 107 be arranged to traverse the outside of the fluid connecting means in the form of the heat radiating tube 103 to detect a thermal differential each time the temperature sensing device 107 passes the established point of the liquid-vapor interface level inside the heat radiating tube 103. The temperature sensing device 107 may be connected to an amplifier which in turn may be connected to a graphical recording device which is calibrated relative to the established levels that the liquid-vapor interface may take in the heat radiating tube 103 so that a change in the interface level may be graphically illustrated over a period of time.

The control circuit means 112 represents the power supply to the reversible motor 106 and also consists of a time limit reversing control wherein the motor 106 is permitted to operate in one direction for a period of times after which a time relay is operated to reverse the power supply to the reversible motor 106 and reverse its direction to reverse the movement of the carriage 105 to traverse a desired length of the heat radiating tube 103 in an opposite direction on the gear rack 104.

Another embodiment comprising the present invention is shown in FIGS. 8 and 9 wherein the fluid connecting means is in the form of a helical heat radiating tube 113 which helically traverses around the liquid column container 114. The upper end of the helical tube 113 is connected to the liquid column container 114 at 115 whereas the lower end of the tube 113 is connected to the elbows 116 and 117, the upper elbow 117 being connected to the liquid column at 118. The particular style of this type of heat radiating tube 113 permits the application of a greater amount of traversing of the fluid media permitted to enter the connections 115 and 118 of the tube 113 since the length of the tube is much greater than the actual length of the liquid column container between connections 115 and 118 of the liquid column container 114. As a result, the liquid level sensing device 5 as shown in FIGS. 8 and 9 is more responsive since for every incremental change of the interface level 120 in the liquid column container 114, there since is a greater corresponding change of the same level within the helically disposed heat radiating tube 113. For example, if the pitch of the helical heat radiating tube 113 is six to one, for every unit change of the interface level 120 within the liquid column container 114 there is a corresponding change of six times that unit in the helical heat radiating tube 113. Thus, with the supply or withdrawal of six times the amount of liquid through the connection 118 into the heat radiating tube 113, a more defined response of the temperature sensing device 121 is possible since six times more liquid is permitted in the helical type heat radiating tube and, therefore, permitting quicker cooling of the liquid while disposed within the tube 113 due to additionally available length of heat radiating surface provided for such cooling by the helical type heat radiating tube. The highest liquid level in the helical tube 113 is that much further from the interface 120.

It should be noted that the gaseous vapor portion of the helical heat radiating tube 113 will also permit the condensation of vapor in the example given above six times as fast as compared to the previously described liquid level sensing devices 5. Although this may be somewhat undesirable, as previously explained, it is known not to outweigh the gain in providing additional tubing for cooling purposes which is provided by the wrap around heat radiating tube 113. To eliminate the affects of too rapid a process of vapor condensate replacing the liquid many times faster than desired, the upper portion of the helical tube 113 may be transposed into a shorter vertical type of fluid connecting means as described in previous embodiments and is depicted in FIG. 8 by the dotted line representation indicated at 122. For that matter, the upper vapor portion of the helical tube 113 may be made into a smaller helical length as compared to the lower liquid portion of the tube 113.

It should be noted that the gaseous vapor portion of 117 function to form the same downwardly extended loop 63 of the fluid connecting means of FIG. 4 to entrap the coolest liquid present in the heat radiating tube 113 and prevent the flow of any hotter liquid from within the liquid column container 114 through the connection 119 into the tube 113 and thus affecting the cooling capabilities provided for by the utilization of the helically shaped tube 113.

I claim:

1. A liquid-vapor interface level indicating device for monitoring changes in the level of the liquid-vapor interface in a vessel containing a liquid zone and vapor zone consisting of its condensible vapor comprising a liquid-vapor column container connected to the vessel across the liquid-vapor interface established therein to form a comparable interface in said column container, fluid connecting means connected to said container, one in proximity of the desired high limit level of the interface therein and the other in proximity of the desired low limit level of the interface therein and having a high ratio or surface area to volume, thermal sensing means in thermal communication with said fluid connection means at said high limit and low limit levels to detect temperatures in said fluid connecting means indicative of the points of maximum allowable ascent or minimum allowable descent of the interface level in said vessel, circuit annunciator means responsive to said detected temperatures, and reference temperature sensing means in thermal communication with said column container above the highest anticipated interface level in said column container to provide for thermal correlation with said thermal sensing means to eliminate detection of temperature differentials in said fluid connecting means caused by pressure changes in the monitored vessel, said fluid connecting means comprises two heat radiating tubes having their ends exposed to the interior of said column container, one with its ends secured below the normal level of said container interface and the other having at least one of its ends secured above the normal level of said container interface, said thermal sensing means comprising electrothermal sensors secured respectively to each of said heat radiating tubes, and a third electrothermal sensor comprising said reference temperature sensing means in thermal communication with said column container above the highest anticipated liquid-vapor interface level in said column container.

2. The liquid-vapor interface level indicating device of claim 1 characterized by a third heat radiating tube having one end exposed to the interior of said column container and secured thereto above said anticipated level, and having its other end closed to form a thimble tube, said third electrothermal sensor secured to said third heat radiating tube.

3. A liquid-vapor interface level indicating device for monitoring changes in the level of the liquid-vapor interface in a vessel containing a liquid zone and a vapor zone consisting of the condensible vapor of the liquid comprising a liquid-vapor column container connected to the vessel across the liquid-vapor interface established therein to form a comparable interface in said column container, dual fluid connecting means having a high ratio of surface area to volume, one such means connected to said container is proximity of the high limit level of the interface and the other such means connected to said container in proximity of the low limit level of said interface, thermal sensing means engaging said high limit fluid connecting means and said low limit fluid connecting means, respectively, a reference temperature sensing device in thermal communication with said column container above the highest anticipated liquid-vapor interface level in said container, said reference sensing device connected to said high limit thermal sensing means to produce a high limit output responsive to temperature changes between their respective engaging positions, said reference sensing device connected to said low limit thermal sensing means to produce a low limit output responsive to temperature changes between their respective engaging positions, annunciator means separably responsive to said outputs, the additive effect of said high limit sensing means and low limit sensing means, respectively, and said reference sensing device to produce said outputs responsive to produce for thermal correlation to prevent said liquid-vapor interface level indicating device from being responsive to pressure changes in the monitored vessel.

4. The liquid-vapor interface level indicating device of claim 3 characterized in that said dual fluid connecting means comprises two heat radiating tubes having one of their ends exposed to the interior of said column container, one of said tubes secured below the normal level of said container interface and the other of said tubes secured above the normal level of said container interface, the other ends of said heat radiating tubes closed to form thimble tubes, said thermal sensing means comprising two electrothermal sensors secured respectively to said heat radiating tubes, and a third electrothermal sensor comprising said reference temperature sensing means in thermal communication with said column container above the highest anticipated liquid-vapor interface level in said column container.

5. The liquid-vapor interface level indicating device of claim 4 characterized by a third heat radiating thimble tube secured thereto above said anticipated level, said third electrothermal sensor secured to said third heat radiating thimble tube.

6. The liquid-vapor interface level indicating device of claim 4 characterized by a downwardly extending open end tube section comprising said exposed end of said heat radiating thimble tubes to form a thermal trap for vapor present therein upon the rise of the container interface level submerging the said exposed end.

7. The liquid-vapor interface level indicating device of claim 4 characterized in that said heat radiating thimble tubes are selectively positioned along the length of said column container through selective of a plurality of openings therealong, and hermitic cap means secured over the nonselected of said openings.

8. The liquid-vapor interface level indicating device of claim 7 characterized by a plurality of heat radiating thimble tubes secured in said openings with their exposed ends in communication with the interior of said column container.

9. The liquid-vapor interface level indicating device of claim 3 characterized in that said dual fluid connecting means comprises at least three heat radiating tubes each having one of their ends exposed to the interior of said column container and extending downwardly therein from the top of said column container, said tubes hermetically secured to said column container top, the first of said tubes exposed ends extending into said column container below the normal level of said container interface, the second of said tube exposed ends extending into said column container above the normal level of said container interface, the third of said tube exposed ends extending into said column container adjacent said column container top, the other ends of said heat radiating tubes exposed to the interior of said column container and secured adjacent the lower end thereof, said thermal sensing means comprising two electrothermal sensors secured to said first and second tubes, a third electrothermal sensor comprising said reference temperature sensing means secured to said third tube, said sensing means secured to said heat radiating tubes above the normal interface level of said column container.

10. The liquid-vapor interface level indicating device of claim 3 characterized in that said dual fluid connecting means comprises a helically shaped heat radiating tube surrounding said column container having its ends exposed to the interior of said column container with one end secured below the normal level of said container interface and the other end secured above the normal level of said container interface, said thermal sensing means comprising two electrical sensors secured to said helically shaped radiating tube, one above and the other below the normal liquid-vapor level established therein, and third electrothermal sensor comprising said reference temperature sensing means in thermal communication with said column container above the highest anticipated liquid-vapor interface level in said column container.

11. The liquid-vapor interface level indicating device of claim 10 characterized by a plurality of helically shaped heat radiating tubes having their ends exposed to the interior of said column container, at least one of said helical radiating tubes with its ends secured below the normal level of said container interface and at least one other of said helical radiating tubes with at least one of its ends secured above the normal level of said container interface, said thermal sensing means comprising two electrothermal sensors each secured to one of said helical radiating tubes.

12. The liquid-vapor interface level indicating device of claim 3 characterized by a thermal trap in said dual fluid connecting means to enclose and cut off vapor present within said thermal trap upon the rise of the container interface level submerging the exposed end of said dual fluid connecting means.

13. The liquid-vapor interface level indicating device of claim 12 characterized in that said dual fluid connecting means comprises at least two heat radiating tubes each having their ends exposed to the interior of and secured to said column container, an upwardly extended loop in said heat radiating tubes at their highest secured end to said column container to form said thermal trap, said thermal sensing means comprising an electrothermal sensor secured to each of said radiating tube loops.

14. The liquid-vapor interface level indicating device of claim 12 characterized in that said dual fluid connecting means comprises at least two heat radiating tubes each having one end exposed to the interior of and secured to said column container, the other end of each of said tubes closed to form said thermal trap, said thermal sensing means comprising an electrothermal sensor secured adjacent the closed end of each of said radiating tubes.

15. The liquid-vapor interface level indicating device of claim 12 characterized in that said dual fluid connecting means comprises at least two heat radiating tubes each having one end exposed to the interior of said column container and each extending downwardly therein a predetermined distance from the top of said column container, said tubes hermetically secured to said column container top, an upwardly extended loop in each of said radiating tubes above said container top and together with said downwardly extending ends within said container forming said thermal trap, the other end of said radiating tube exposed to the interior of said column container and secured to the lower end thereof, said thermal sensing means comprising an electrothermal sensor secured to each of radiating tubes above the normal interface level of said column container.

16. The liquid-vapor interface level indicating device of claim 3 characterized by a traveling carriage reciprocally along the length of said dual fluid connecting means and having an electrothermal sensor comprising said temperature sensing means secured thereto for travel therewith to engage the surface of said connecting means to detect temperature differentials along the surface of said dual fluid connecting means, reversible motor means to reciprocally drive said carriage, and circuit control means to periodically reverse the operation of said motor.

References Cited

UNITED STATES PATENTS

| | | | |
|---|---|---|---|
| 1,485,492 | 3/1924 | Du Pont. | |
| 1,823,397 | 9/1931 | Guy | 73—295 |
| 1,833,112 | 11/1931 | Harrison | 73—295 |
| 1,962,187 | 6/1934 | Flock | 73—295 |
| 2,962,566 | 11/1960 | Lisac. | |
| 3,120,757 | 2/1964 | Smith | 73—295 |
| 3,161,050 | 12/1964 | Exher | 73—295 |
| 3,132,514 | 5/1964 | Plessinger | 73—295 |

FOREIGN PATENTS

| | | |
|---|---|---|
| 971,976 | 8/1950 | France. |

S. CLEMENT SWISHER, Primary Examiner